United States Patent [19]
DeLeon

[11] Patent Number: 5,584,231
[45] Date of Patent: Dec. 17, 1996

[54] MULTI-PURPOSE FOOD TOASTER/WARMER

[76] Inventor: Carlos DeLeon, 102 S. "H", Toppenish, Wash. 98948

[21] Appl. No.: 542,516

[22] Filed: Oct. 13, 1995

Related U.S. Application Data

[63] Continuation of Ser. No. 115,512, Sep. 1, 1993, abandoned.

[51] Int. Cl.$^6$ ............................................. A47J 37/08
[52] U.S. Cl. .................... 99/332; 99/340; 99/376; 99/378; 99/390; 99/391; 99/393; 99/400; 99/448; 219/492; 219/521
[58] Field of Search ........................... 99/331–333, 385, 99/340, 389–402, 427, 339, 448, 400, 376–379, 390–393; 219/482, 521, 386, 501, 492, 497

[56] References Cited

U.S. PATENT DOCUMENTS

| | | | |
|---|---|---|---|
| 1,361,183 | 12/1920 | Reed | 99/427 |
| 1,450,381 | 4/1923 | Mieville | 99/390 |
| 1,687,712 | 10/1928 | Chandler | 99/390 |
| 1,832,831 | 11/1931 | Ginder | 99/390 |
| 1,850,750 | 1/1932 | Freeman | 99/385 |
| 2,047,046 | 4/1934 | Wade | 99/327 |
| 2,387,817 | 10/1945 | Wales | 99/327 |
| 2,400,640 | 3/1946 | Hanson et al. | 99/391 |
| 2,410,985 | 1/1947 | Malmquist | 99/341 |
| 2,441,190 | 5/1948 | Fuller | 99/390 |
| 2,553,593 | 7/1951 | Lermont | 161/1 |
| 2,582,760 | 1/1952 | Schoonmaker | 99/391 |
| 2,764,081 | 9/1956 | Glasser | 99/390 |
| 2,907,267 | 8/1959 | Lindsey | 99/339 |
| 2,910,929 | 11/1959 | Sorenson | 99/390 |
| 3,087,418 | 4/1963 | Albright | 99/386 |
| 3,279,350 | 10/1966 | Kaplan | 99/390 |
| 3,412,674 | 11/1968 | Ruth | 99/402 |
| 3,421,432 | 1/1969 | Giepen | 99/332 |
| 3,882,766 | 5/1975 | Matlen | 99/327 |
| 4,241,648 | 12/1980 | Longnecker | 99/349 |
| 4,346,651 | 8/1982 | Schickedanz | 99/392 |
| 4,487,115 | 12/1984 | Su | 99/327 |
| 4,664,025 | 5/1987 | Martinez | 99/331 |

FOREIGN PATENT DOCUMENTS

| | | | |
|---|---|---|---|
| 3628617A | 3/1988 | Germany | 99/385 |

*Primary Examiner*—Timothy F. Simone
*Attorney, Agent, or Firm*—Stratton Ballew PLLC

[57] ABSTRACT

An apparatus to heat or toast tortillas, and uses adjustable food support arrays and heating element arrays, forming a single food enclosure or a plurality of food enclosures, to change the proximity of the heating elements to the food items being heated so that the device can be used for heating or toasting a variety of food items in addition to tortillas.

20 Claims, 11 Drawing Sheets

MULTI-PURPOSE FOOD TOASTER/WARMER

This application is a continuation of Ser. No. 08/115,512, filed Sep. 1, 1993, now abandoned.

TECHNICAL FIELD

This new invention comprises an apparatus to heat or toast tortillas, and uses adjustable food support arrays and heating element arrays, forming a single food enclosure or a plurality of food enclosures, to change the proximity of the heating elements to the food items being heated so that the device can be used for heating or toasting a variety of food items in addition to tortillas.

BACKGROUND OF THE INVENTION

While toasters and toaster ovens are well known appliances, there is no heating or toasting appliance which fully addresses the unique physical handling characteristics of a tortilla, while still remaining flexible enough to accommodate heating and toasting of non-tortilla food items such as conventional pieces of bread, sweet rolls, pastries, small pizzas, sandwiches, and other hot food items. The large surface area of a tortilla makes it impossible to adequately heat or toast a large number of tortillas at one time in conventional ovens or toaster overs. Also, the large diameter and thinness of tortillas make it impossible to heat or toast a tortilla in a conventional toaster designed for use with bread. Accordingly, the inventor perceived a need for such a device and set about creating a new device to meet these needs. Of particular interest to the inventor was the desire that this new device would not only be able to accommodate the special physical handling characteristics of a tortilla, but that this device would be adjustable and could also be used as a conventional toaster or toaster oven with non-tortilla food items. Such flexibility would also enhance the marketability of this new device. This invention addresses all of these problems and reaches all of these desired goals.

DISCLOSURE OF THE INVENTION

It is the object of the present invention to provide an adjustable food heater which has a food enclosure that is adjustable for foods of different sizes.

It is another object of the present invention to provide an adjustable food heater which has plurality of food enclosures.

It is the further object of the present invention to provide an adjustable food heater which has a plurality of adjustable food enclosures that can be adjusted simultaneously with a single set of controls.

It is yet another object of the present invention to provide an adjustable food heater which can be placed in both horizontal and vertical orientations.

The present invention achieves these and other objectives which will become apparent from the description that follows, by providing an adjustable food heater with a plurality of adjustable food enclosures which are created using groups of arrayed elements. All of the elements in each group are connected together and arrayed so that they can be moved at one time to adjust the food enclosure size. In one preferred embodiment of the present invention, the adjustable food enclosures are formed by pluralities of heating plates and food support screens arrayed and arranged into a plurality of groups. In this embodiment, the food heater also has a body with a rectangular base, a first and a second end, a front with an open area extending between the first and second ends for access to the plurality of adjustable food enclosures, and a back.

A pair of carrier rails, which are substantially parallel to one another, extend the length of the body. One carrier rail is mounted proximate the body back. The other carrier rail is mounted proximate the body front near the open area lower edge. The groups of arrayed elements are arranged longitudinally along the length of the body with the surfaces of the plates oriented so that the arrayed elements are substantially aligned and parallel to one another, and perpendicular to the longitudinal axis of the body. With this arrangement of elements, each food enclosure has a fixed position heating plate, a first food support screen, an opening with a food basket to hold the food item, a second food support screen, and an adjustable heating plate.

The fixed position heating plates are arrayed at regular intervals along and fixedly attached to the carrier rails. Each of the arrayed elements of the other groups, which are all adjustable, are arrayed at regular intervals along and fixedly attached to a set of positioning rails. Each set of positioning rails is slidably attached to the back carrier rail and another positioning rail is slidably attached to the front carrier rail. A control device is provided for each set of positioning rails and the adjustable arrayed elements attached thereto.

Each food basket has two ends. Each first end is slidably and pivotally attached to the front carrier rail. Each food basket second end is slidably attached to a back section of a support frame that is substantially parallel to and proximate the back carrier rail, but which support frame is not attached to the back carrier rail. The support frame also has a single lifting rod which is slidably or rotatably attached to the center support rail of the entire food basket array. This lifting rod pivots on a hinge set in the body of the food heater, and ejects the food item when pushed down, or away from, the operator. Likewise, food items can be lowered into the food heater by use of this lifting rod. A locking mechanism is built into the body of the food heater which can be used to hold the food baskets in a raised position.

Another preferred embodiment of the present invention is very similar to the above embodiment, but the adjustable food heater is modified so that it also may be used in a vertical orientation. In this embodiment, the body is placed on the first end. The food items to be prepared are placed in the adjustable food enclosures as above, but sit on the first food support screens of the enclosures rather than the food basket. To compensate for this arrangement, the first group food support screens are thicker and constructed of heavier materials than the second group food support screens. Also, restraining mechanisms are provided for the positioning rails, which continue to allow them to slide as with the above embodiment while preventing the second group food support screens and the adjustable heating elements from collapsing on the food.

In another preferred embodiment of the present invention, the adjustable food heater is made automatic so that all of the adjustable arrays which are described can be moved into a predetermined position by use of a single switch or other actuating mechanism. This embodiment would be an automatic version of the invention described in this patent, and would in all respects be identical to the invention as described, except that all the adjustments in the various movable arrays would be accomplished simultaneously by use of electric motors or other motorized or magnetic means of adjusting the position of each movable array.

In a further alternative preferred embodiment of the present invention, an adjustable food heater as described in detail in the first preferred embodiment is provided. In this embodiment, the groups of arrayed elements are not attached to carrier rails by sets of positioning rails. Instead, a single positioning rail is provided for each group of arrayed elements. As with the front positioning rails above, each of the elements of a particular group is arrayed along the length of and fixedly attached to a position rail. In this embodiment, however, each positioning rail rests atop the lower edge of the body open area, which provides a sliding surface.

A longitudinal slot is formed in the body back that extends substantially the length of the body. Each element has a stud that extends into the slot and allows the element to slide laterally along the slot. Thus, the same plurality of food enclosures is simultaneously adjustable and all of its accompanying advantages are provided with a different sliding mechanism.

In yet another preferred embodiment of the present invention, an adjustable food heater is provided. In this embodiment, the food baskets are not attached to a support frame. Instead, a support member with substantially the same curvature as the food basket is provided for the individual food basket. The support members are fixedly attached to the carrier rails if provided, or rest on the open area lower edge and a stud in a back slot if that configuration is used. Regardless, each food basket rests on the corresponding support member and is pivotally attached at its front end to a handle. When the food items are to be removed, pressure is applied to the handle and the food baskets pivot about their front ends raising the food items from the food enclosures.

In an additional preferred embodiment, the arrayed elements are circular in shape, except for the food baskets which are semicircular.

BEST MODE IN CARRYING OUT THE INVENTION

Figure 1:
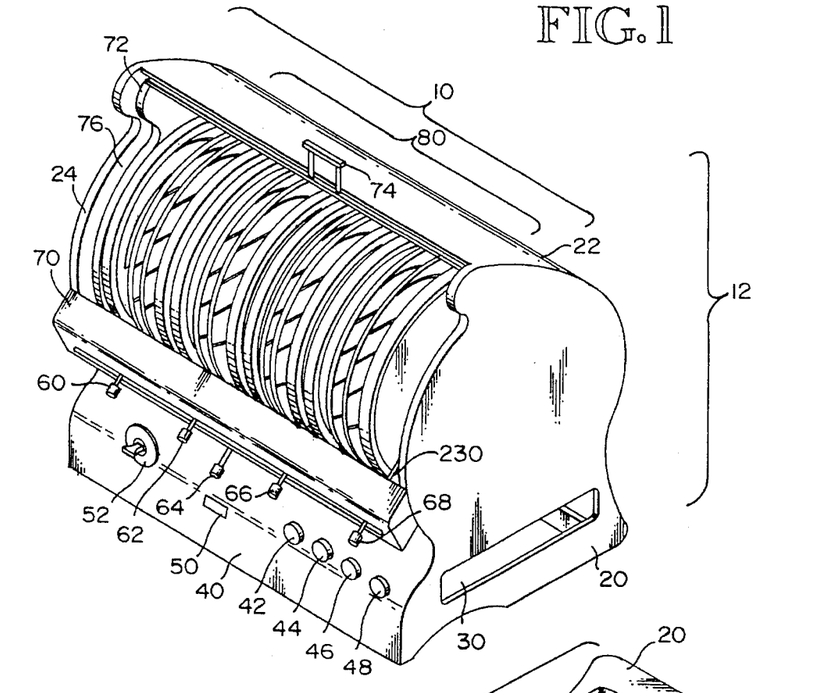
FIG. 1 Three dimensional isometric view with the front cover open showing the device with the various adjustable arrays aligned in a vertical position.
Figure 2:
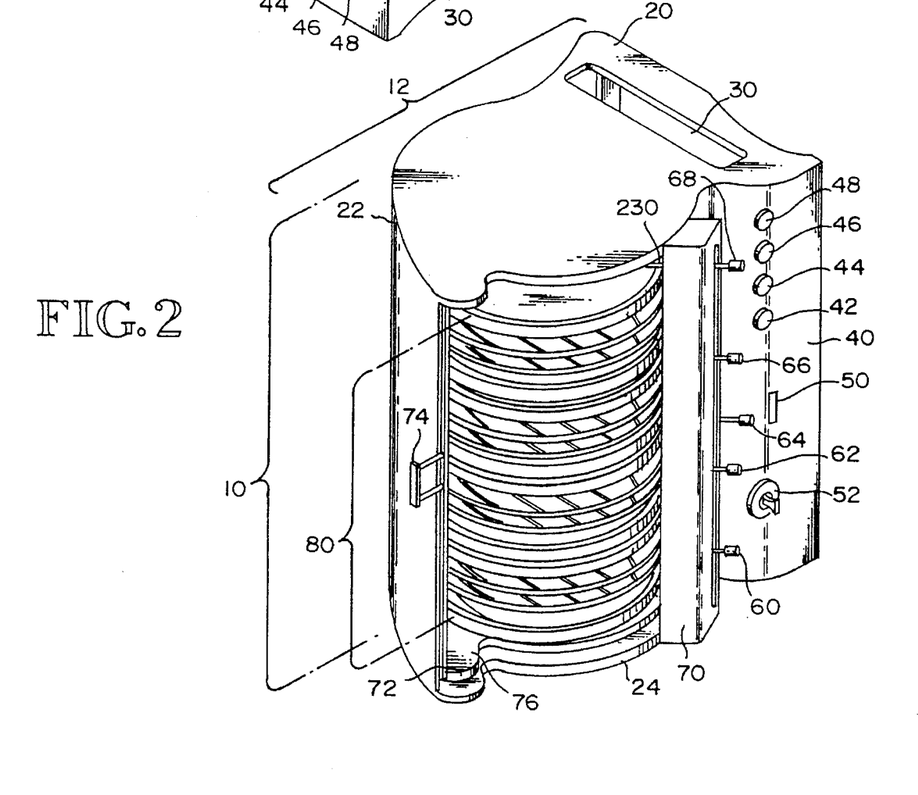
FIG. 2 Three dimensional isometric view with the front cover open showing the device with the various adjustable arrays aligned in a horizontal position by placing the device on end on a counter or table top.

With reference to FIGS. 1 and 2, an adjustable food heater 10 is shown. The heater has a body 12 with a front 40, a first end 20 and a second end 24, a back 22, and an open area 80 in the body front which extends substantially from first end 20 to second end 24. A rotatably closing door 72 with handle 74 is provided to cover the open area 80 and close the food heater 10 when it is in use. The body's 12 horizontal cross section is rectangular in shape, although other shapes would be equally utilitarian.

Opening 30 (FIGS. 1, 2, and 16) is designed for insertion of a tray to catch crumbs. This crumb tray is not shown in any of the illustrations. The crumb tray can be square, rectangular, oval, or circular in horizontal cross section, and can be inserted from side 20, side 24, or back 22 of body 12 of the adjustable food heater 10. Cover 70 serves as both a protective cover for the adjustable arrays, and also for support of control rods 60, 62, 66, and 68. Control rod 64 extends from the food heater body 12 below and separate from cover 70, and is attached to the food heater body by a separate mechanism shown in FIG. 16, and described below.

Figure 3:
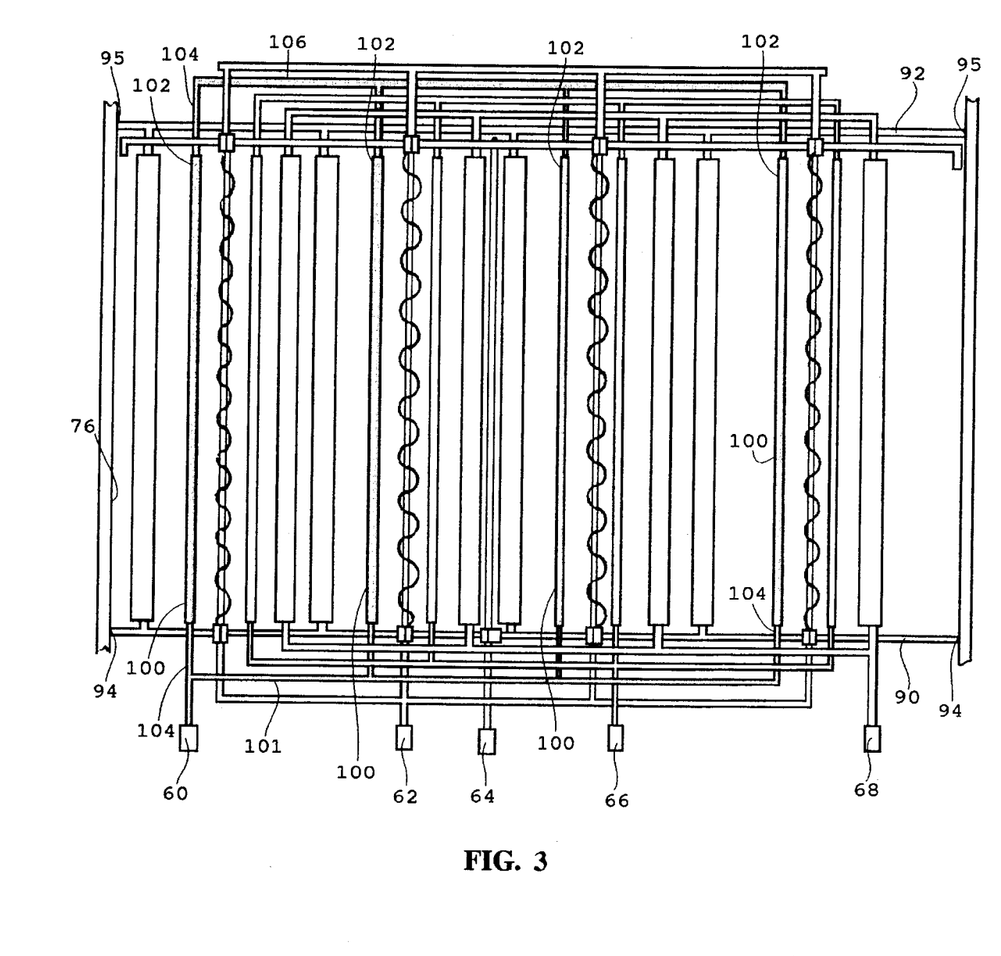
FIG. 3 Schematic view showing the movable arrays in relationship with one another, and numbering all portions of the first food support array, which has been shaded for ease of reference.

With reference to FIG. 3, a pair of carrier rails, front 90 and back 92, extend the length of the body and are substantially parallel to one another and the longitudinal axis of the body 12 (See FIGS. 1 and 2). The front carrier rail 90 is located proximate the lower edge 230 of front open area 80 (FIGS. 1 and 2) with its ends 94 attached to body first end inside 73 and body second end 24. The back carrier rail 92 is located proximate the body back 22 with its ends 95 also attached to body first end inside 73 and body second end 24.

In the figures attached, the back carrier rail 92 is mounted higher than the front carrier rail 90. This configuration functions well, but is only one possible configuration of the food heater. The vertical positioning of the back carrier rail relative to the front carrier rail is a function of the type of food items to be handled and the ease of operating the food heater, i.e. the insertion and removal of food items in the heater that is discussed in greater detail below. Depending on the type of food items to be prepared, the back carrier rail 92 can be at the same height as or even somewhat lower than the front carrier rail 90.

FIG. 3 illustrates one possible embodiment of these first group adjustable food support screens. The first group food support screens 100 are arrayed along the length of and slidably connected to the front and rear carrier rails 90 and 92. The plurality of first group food support screens 100 form an adjustable first food support screen group 102. Each first group food support screen is attached to a crossmember 104, which is an elongated rod that is fixedly connected at either end to front slidable control rod 101 and rear slidable control rod 106, suspending each first group food support screen within the open area between fixed carrier rails 90 and 92. The first group food support screens are arrayed at regular intervals along the carrier rails. Control rod 60 is used to adjust the entire first food support screen group 102 into the desired position.

Figure 4:
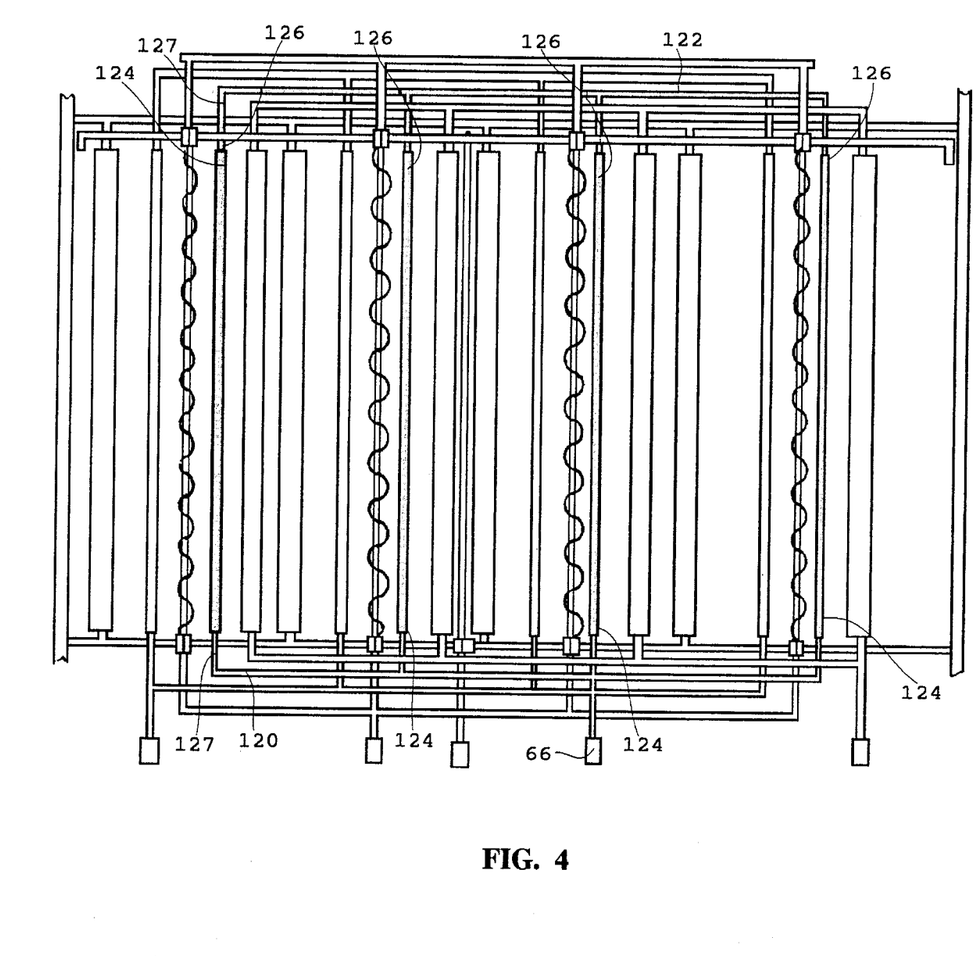
FIG. 4 Schematic view showing the movable arrays in relationship with one another, and numbering all portions of the second food support array, which has been shaded for ease of reference.

FIG. 4 illustrates one possible embodiment of the second group adjustable food support screens, the second group food support screens 124 are arrayed along the length of and slidably connected to the front and rear carrier rails 90 and 92. The plurality of second group food support screens 124 form an adjustable second food support screen group 126. Each second group food support screen 124 is attached to a crossmember 127, which is an elongated rod that is fixedly connected at either end to front slidable control rod 120 and rear slidable control rod 122, suspending each second group food support screen within the open area between fixed carrier rails 90 and 92. The second group food support screens are arrayed at regular intervals along the carrier rails. Control rod 66 is used to adjust the entire second food support screen group 126 into the desired position.

Figures 13, 14A, 14B, 14C:
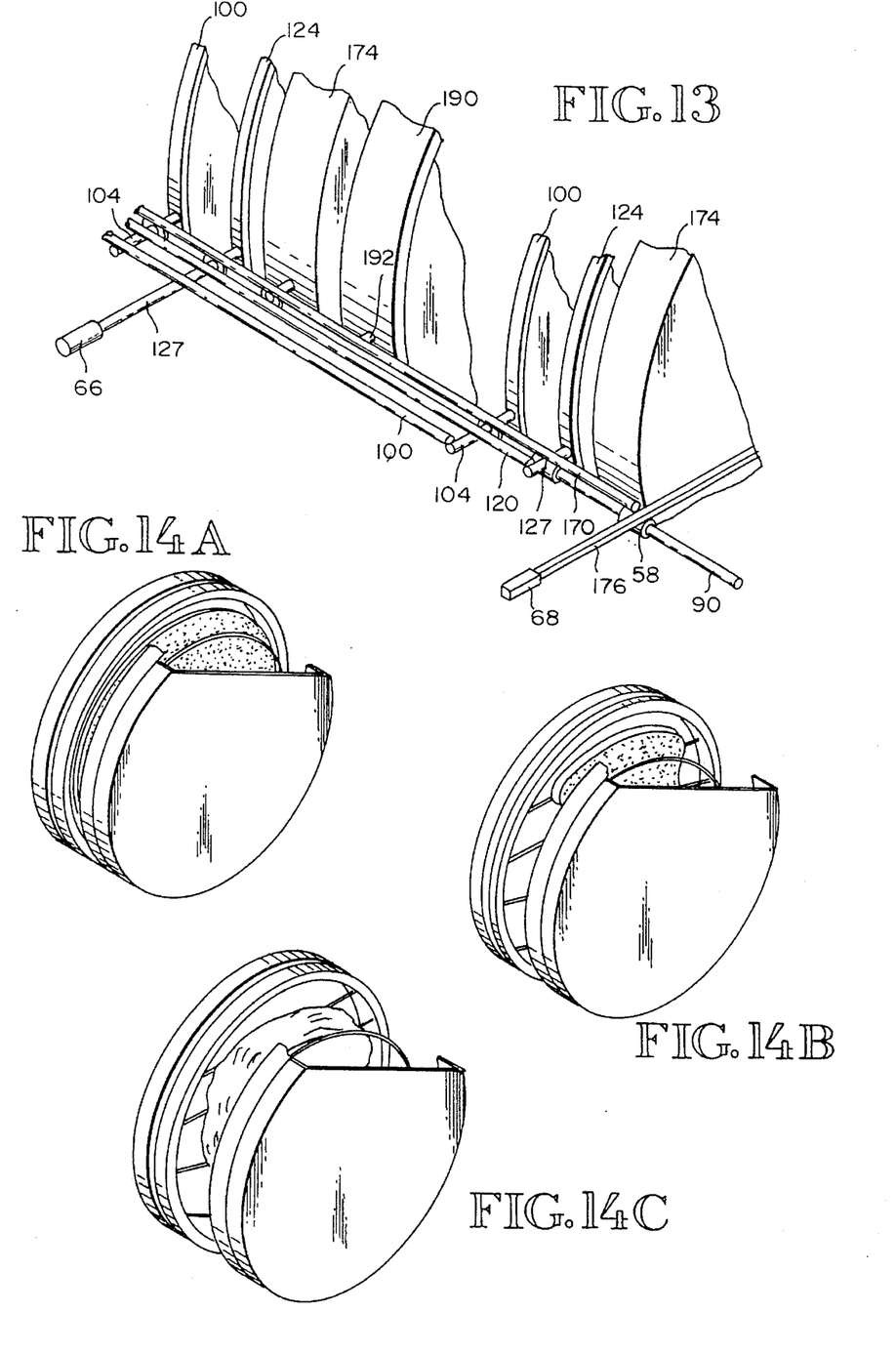
FIG. 13 Three dimensional isometric view of the slidable connections between several front positioning rails and the front carrier rail.
FIG. 14A Three dimensional isometric view of complete food enclosure adjusted for holding and heating a tortilla.
FIG. 14B Three dimensional isometric view of complete food enclosure adjusted for holding and heating toast.
FIG. 14C Three dimensional isometric view of complete food enclosure adjusted for holding and heating a pastry.

In an alternative embodiment of food support screens 100 and 124, each screen has three small hooks attached to the side of each food support screen facing the food item in each food enclosure 76 (FIGS. 14A, 14B, and 14C). Two of these hooks would be placed at the juncture of each screen 100 and 124 and crossmembers 104 and 127 respectively, while the third hook would be placed at the bottom of each food support screen. The purpose of these hooks would be to hold in place a thin sheet of TEFLON®, or other nonstick heat tolerant cooking surface, on each of the food support screens facing the food item. Such TEFLON® inserts could be used to improve toasting, flatten the food item being toasted, or to prevent spattering from food items. This alternative embodiment is not shown in any of the illustrations.

Figure 5:
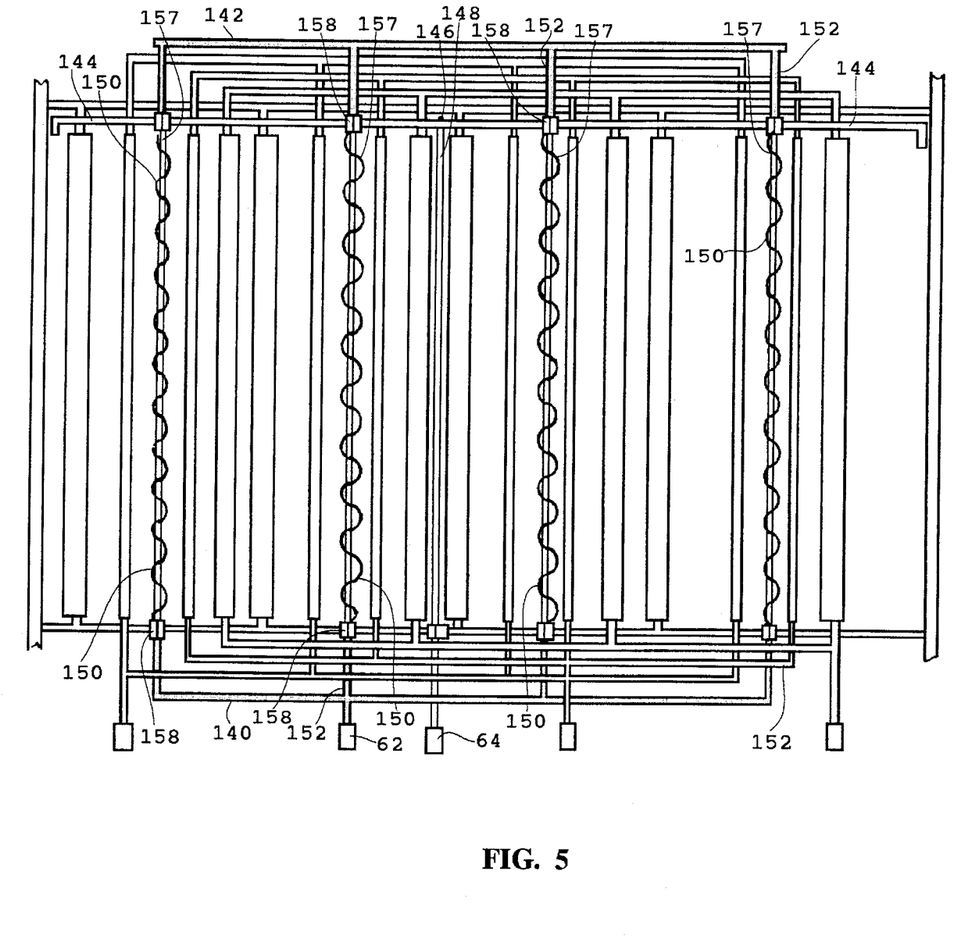
FIG. 5 Schematic view showing the movable arrays in relationship with one another, and numbering all portions of the food basket array, which has been shaded for ease of reference.
Figure 10A:
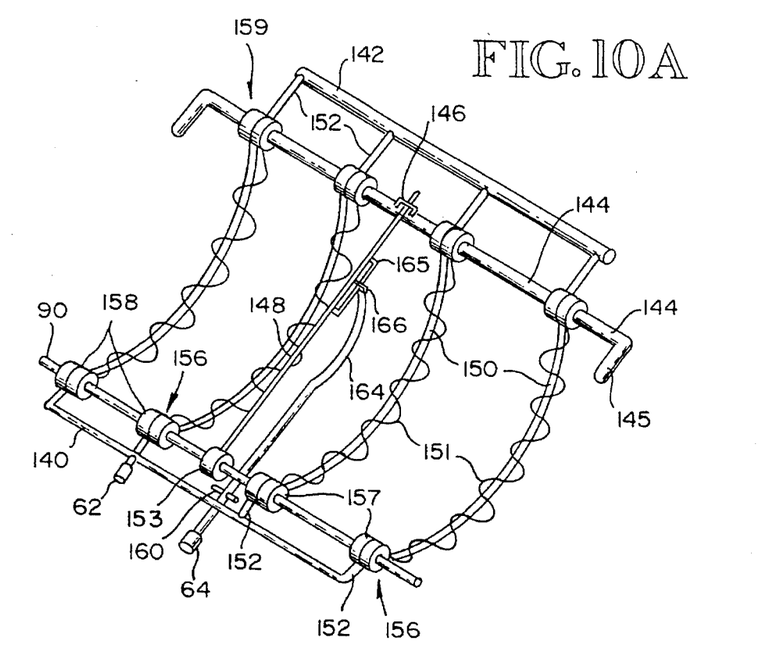
FIG. 10A Three dimensional isometric view of the food basket array group.
Figure 10B:
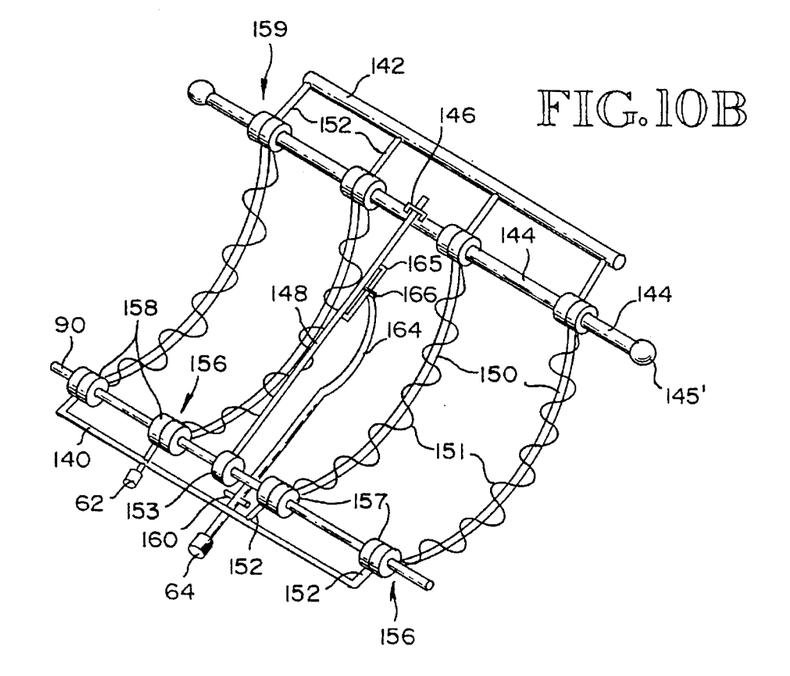
FIG. 10B Three dimensional isometric view of an alternative embodiment of the food basket array group.

In FIGS. 5, 10A, and 10B, the food basket supports 150 are arrayed along the length of and slidably connected to front carrier rail 90 and rest unconnected on top of rear carrier rail 92, suspending each food basket support 150 within the open area between fixed carrier rails 90 and 92. The food basket supports are arrayed at regular intervals along the carrier rails 90 and 92. The plurality of food basket supports 150 form an adjustable food basket support group 154. Control rod 62 is used to adjust the entire food basket support group 154 into the desired position. The rear food basket support rails 142, 144 and 152 are not connected to the rear carrier rail 92, to permit loading and ejection of the food items by use of lifting control rod 164 with handle 64. Each food basket support is attached to a crossmember 152, which is an elongated rod that is fixedly connected to front positioning rail 140, and which is pivotally and slidably connected to the front carrier rod 90. Crossmember 152 is fixedly attached to the rear positioning and support rails 142 and 144. Neither crossmember 152, nor rear positioning and support rails 142 and 144 are connected to rear carrier rail 92, but rest upon rear carrier rail 92 to accommodate adjustments to the position of the food basket support array, and to accommodate loading and ejecting food by means of the lifting control rod 164 with handle 64. FIG. 5 is a schematic diagram illustrating one possible embodiment of the adjustable food basket support array.

Figure 16:
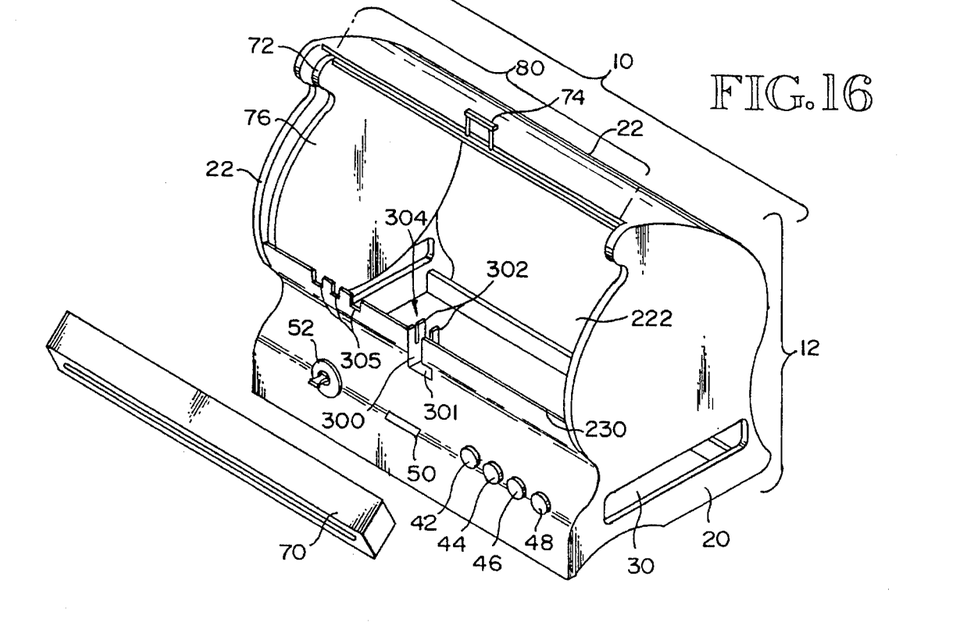
FIG. 16 A three dimensional isometric view with the front cover open showing the device with the food enclosure arrays removed.

FIG. 10A also illustrates one possible embodiment of the adjustable food basket support array, and further illustrates its component parts. The food baskets are formed from an undulating wire 151 attached at intervals to the food basket support rail 150 to prevent any food items from falling past the main wire. At the same time, this configuration allows crumbs to fall through and keeps the food baskets clear. Center support rail 148 is pivotally and slidably attached to front carrier rail 90, and is pivotally and slidably attached to rear positioning and support rail 144. Lifting control rod 164 is pivotally and slidably attached to the food heater body 12 by means of studs 160 (FIG. 10A) which fit into slots 304 cut into support plates 302 (FIG. 16). The lifting control rod 164 can be optionally locked into the raised position by the operator by moving handle 64 of lifting control rod 164 into slot 301. Different locking mechanisms, other than that illustrated in FIG. 16, could function equally well for this purpose. Center support rail 148 is also pivotally and slidably attached to lifting control rod 164 by means of bracket 165 (attached to center support rail 148) and bracket 166 (attached to control rod 164). Center support rail 148 could also be rotatably attached to lifting control rod 164. This alternative embodiment is not shown in the illustrations.

The operator of the food heater device can eject food from the food heating device by pushing handle 64 of lifting control rod 164 down or away from the operator, which then causes the rear food basket support assembly of 142 and 144 to rise up and partially eject the food item. Control rod 164 pivots by means of studs 160 which are set into slots 304 cut into support members 302 (FIG. 16). While the entire food basket support assembly is being raised, the front positioning rail assembly 140 does not rotate. This is because of the construction of the front food basket support sleeves 156. Each food basket support rail 150 is fixedly connected to sleeve section 157. Each front positioning rail cross member 152 is fixedly connected to sleeve section 158. Sleeve sections 158 and 157 are rotatably attached to form sleeve mechanism 156, which is slidably and pivotally attached to front carrier rail 90. When lifting control rod 164 is used to raise the food basket support assembly, sleeve section 157 rotates with the raising food basket assembly while sleeve section 158 is stationary.

Likewise, food items can be lowered into the food heater by raising lifting control rod 164 from a depressed position with food item present in the food basket(s) so that the food item, and the rear food basket support assembly 142 and 144 is lowered back into the food heater device.

Figure 6:
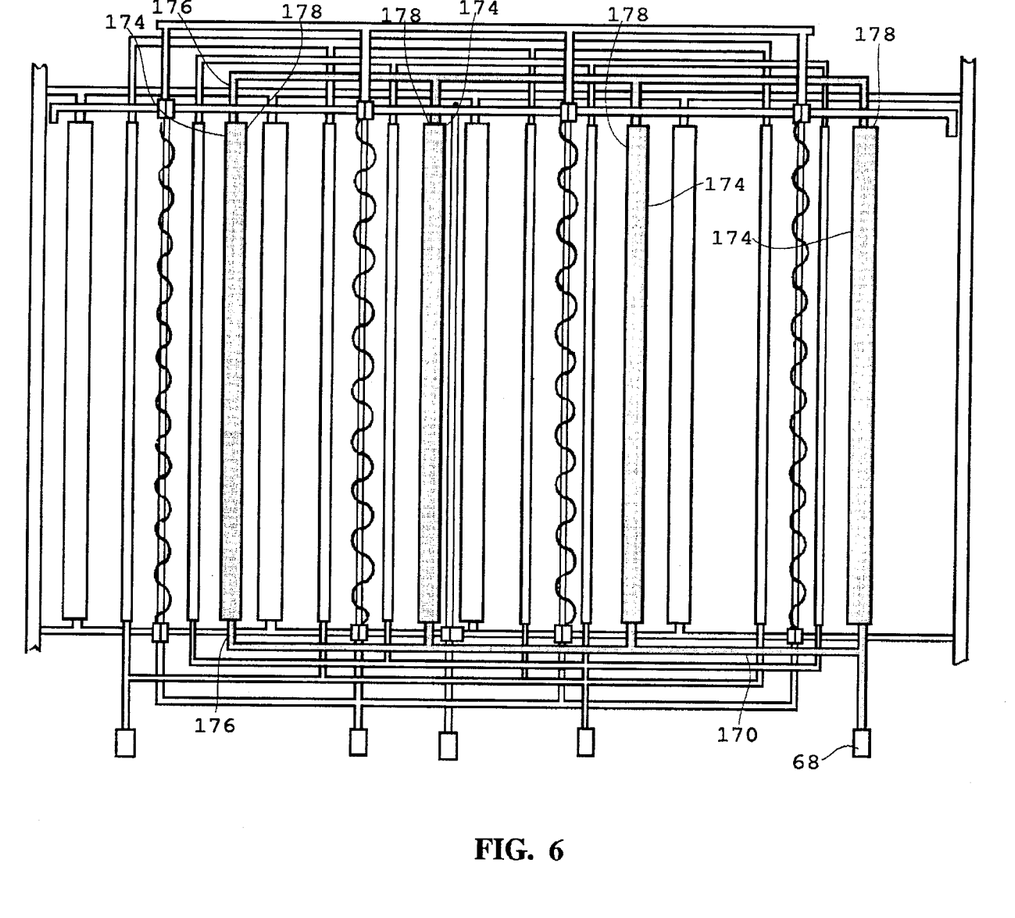
FIG. 6 Schematic view showing the movable arrays in relationship with one another, and numbering all portions of the movable heating array, which has been shaded for ease of reference.

FIG. 6 illustrates one possible embodiment of the second group adjustable elements. Adjustable heating plates 174 are arrayed along the length of and slidably connected to the front and rear carrier rails 90 and 92. The plurality of adjustable heating plates 174 form an adjustable heating plate group 178. Each adjustable heating plate is attached to a crossmember 176, which is an elongated rod that is fixedly connected at either end to front positioning rail 170 and rear positioning rail 172, suspending each second group heating plate within the open area between fixed carrier rails 90 and 92. The adjustable heating plates are arrayed at regular intervals along the carrier rails. Control rod 68, fixedly attached to front positioning rail 170, is used to adjust the entire adjustable heating plate group 178 into the desired position.

Figure 7:
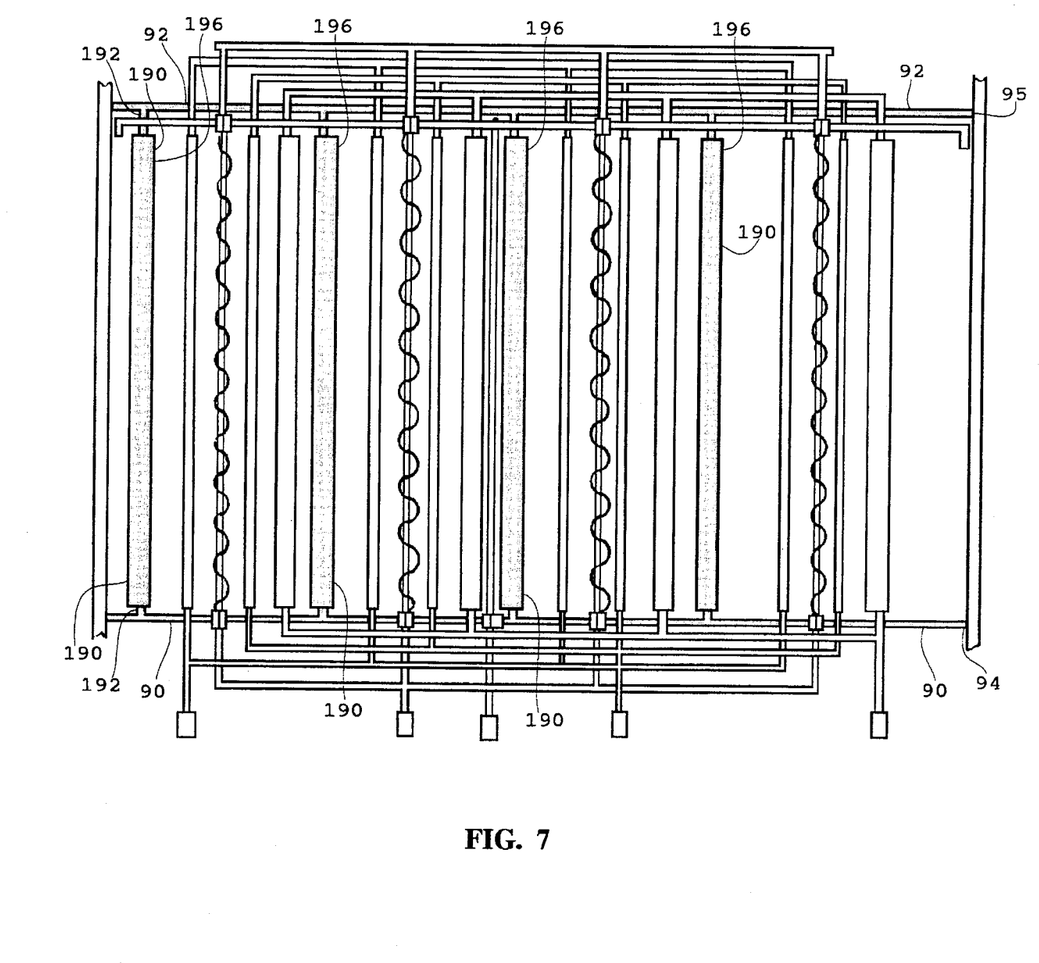
FIG. 7 Schematic view showing the movable arrays in relationship with one another, and numbering all portions of the fixed position heating element array, which has been been shaded for ease of reference.

FIG. 7 illustrates one possible embodiment of the first group fixedly attached heating elements. Fixed position heating plates 190 are arrayed along the length of and fixedly attached to the front and rear carrier rails 90 and 92. The plurality of fixed position heating plates 190 form a fixed position heating plate group 196. Each fixed position heating plate is attached to a crossmember 192, which is an elongated rod that is fixedly attached to the carrier rails at either end, suspending each first group heating plate within the open area between the carrier rails. The first group heating plates are arrayed at regular intervals along the carrier rails.

In an alternative embodiment of fixed position heating elements 190 and adjustable heating elements 174, each heating element would have three small hooks attached to the side of each heating element facing the food item in each food enclosure 76 (FIGS. 14A, 14B, and 14C). Two of these hooks would be placed at the juncture of each heating element insulating plate 191 and crossmembers 176 and 192 respectively, while the third hook would be placed at the bottom of each heating element insulating plate 191, directly below the end of additional cross support member 177 (shown in FIG. 11). The purpose of these hooks would be to hold in place a thin sheet of TEFLON®, or other nonstick heat tolerant cooking surface, covering the otherwise exposed heating elements facing the food items. Such TEFLON® inserts could be used to improve toasting and to prevent spattering from food items, as well as for other purposes. This alternative embodiment is not shown in any of the illustrations.

There are a number of ways to slidably connect the carrier rods and positioning rails. One successful configuration is shown in FIG. 5 and in greater detail in FIG. 13. The adjustable groups' crossmembers 104, 127, 152 (front only), and 176 extend beyond and are substantially perpendicular to both carrier rails 90 and 92. A short piece of tubing 58 that can slide over the carrier rails is placed around each carrier rail and fixedly attached to the first and second ends of crossmembers 104, 127, 152 (front only), and 176 at their respective intersections with the carrier rails. Thus, the front and rear positioning rails of each adjustable array are slidably attached to the front and rear carrier rails. For simplicity and ease of illustration, FIG. 13 does not show the food basket array, connected to crossmember 152 (front only).

When assembled, the sequence of the groups of arrayed elements form a plurality of food enclosures 76, that are adjustable for size and can accommodate different shapes of food within certain practical limits. FIGS. 14A, 14B, and 14C show examples of food enclosures 76 being used with tortillas and other food items. It is important to note that the adjustable elements of this food heater could work equally well in a device which is comprised of either a single food enclosure or a plurality of food enclosures. The illustrations show a food heater with four food enclosures only by way of illustration and example and are not intended to limit application of the concepts embodied in this invention. This invention would work equally well with more or less than four food enclosures 76.

As best illustrated in FIGS. 3 through 7, each adjustable group's positioning rails are attached only to that group's crossmembers to allow independent motion of each separate adjustable group. At the same time, however, the first food support group's positioning rails cross over the food basket support group's crossmembers since the food basket support group's crossmembers are longer than the first food support group's crossmembers. Similarly, second food support group's positioning rails also cross over the first food support group's crossmembers and the food basket support group's crossmembers since their crossmembers are longer than the second food support group's crossmemebers. This pattern is repeated among the various adjustable group's positioning rails and crossmembers and results in the various adjustable groups being held firmly in place without additional strengthening devices, and without sacrificing the lateral slidable movement of the groups.

Figure 11:
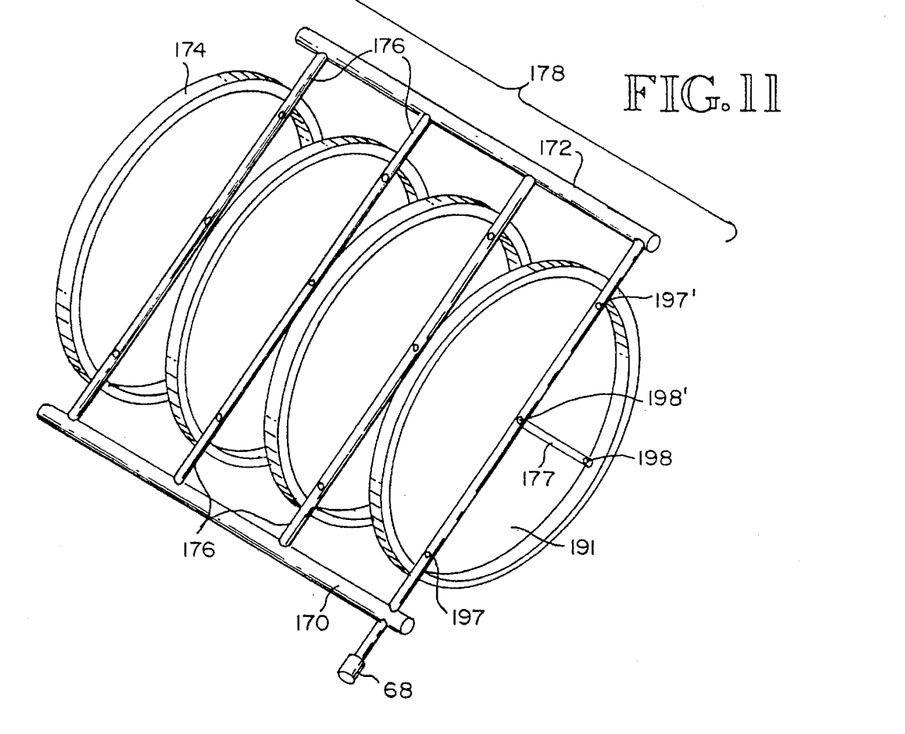
FIG. 11 Three dimensional isometric view of the movable heating element array group.
Figure 12:
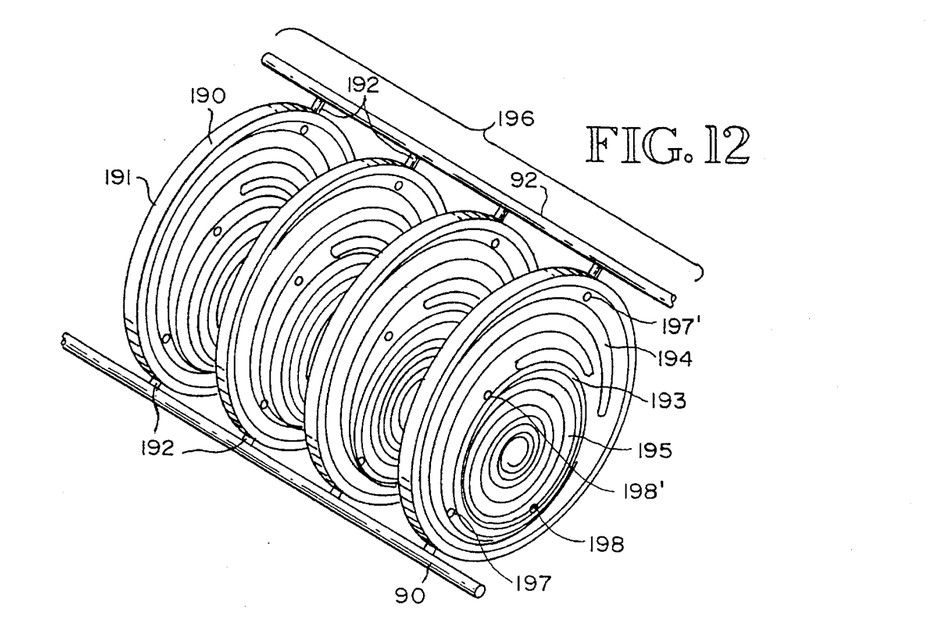
FIG. 12 Three dimensional isometric view of the fixed position heating element array group.

The heating plates for both the movable and fixed position heating element groups are virtually identical with the only difference being that their heating plates face one another to form a food enclosure 76 (FIGS. 14A, 14B, and 14C). FIGS. 11 and 12 show that each heating plate contains a large electric heating element 194, and a small electric heating element 195, arranged in a specific pattern on one side of each plate. This pattern is configured to maximize the efficiency of the food heater. The back side 191 of each heating plate includes an insulating material. Each large electric heating element 194 is secured to each heating plate 190 by means of fasteners 197 and 197'. Each small electric heating element 195 is secured to each heating plate 190 by means of fasteners 198 and 198'. FIG. 11 shows how fasteners 197 and 197' connect through the back 191 of each heating plate onto the crossmember itself, and shows how fasteners 198 and 198' connect through the back 191 of each heating plate onto an additional heating plate support rod 177 for additional support and stability. Support rods 177 are each fixedly connected directly to the midpoint of each crossmember 176 and 192. Other configurations for the heating plates are contemplated and could be used successfully.

FIGS. 14A, 14B, and 14C each depict a food heating array 76, comprised of first heating plate 174, first food support screen 100, food basket 150 (not visible in this illustration), second food support screen 124, and stationary heating plate 190. In FIG. 14A, a tortilla is shown in the food heating array 76. It can be noted in this illustration that the components of the food heating array are located in close proximity to one another, a position allowed by the variable sliding adjustment of both food support screens, the food basket, and one or both heating plates. FIG. 14B shows the food heater in use heating or toasting a slice of bread. In this instance, the components of the food heating array 76 are further apart than they are in FIG. 14A, thus accomodating the thicker food item. The muffin being heated in FIG. 14C is thicker than both the tortilla and the bread slice, and requires more space between the components of the food heating array.

Each small electric heating element 195 and large electric heating element 194 are separately removable from heating plate 190, to facilitate repair and replacement of broken or old heating elements. The operator of the food heater can also elect to activate only the small electric heating element, by means of selector switch 50 (FIGS. 1 and 2). When the large electric heating element is selected, both the small and large heating elements are activated simultaneously. The small electric heating elements 195 can be used with small corn or flour tortillas, and other smaller diameter food items, while the combination of the large electric heating elements 194 with the small electric heating elements 195 can be used with large flour or corn tortillas, and larger diameter food items.

Each of the four food enclosures 76 (see FIGS. 1, 2, 14A, 14B, and 14C) can be operated independently of each other by means of selector buttons 42, 44, 46, and 48. Selector button 42 activates the first food enclosure group. Selector button 44 activates the second food enclosure group. Selector button 46 activates the third food enclosure group. And, selector button 48 activates the fourth food enclosure group. Other configurations for the selector mechanism are contemplated and could be used successfully. Timer 52 (See FIGS. 1, 2, and 16) is used by the operator of the food heater to regulate the time food items are heated or toasted, and is also used to turn on the electric power for the electric heating elements. Once the selected time period has expired, the timer switch 52 automatically turns off the power to the electric heating elements.

Figure 8:
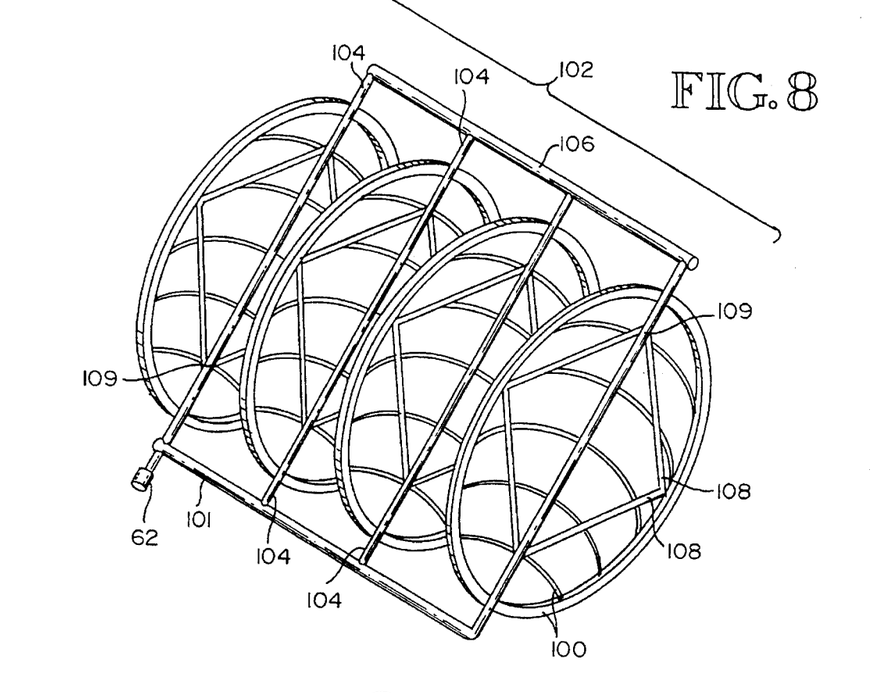
FIG. 8 Three dimensional isometric view of the first food support array group.
Figure 9:
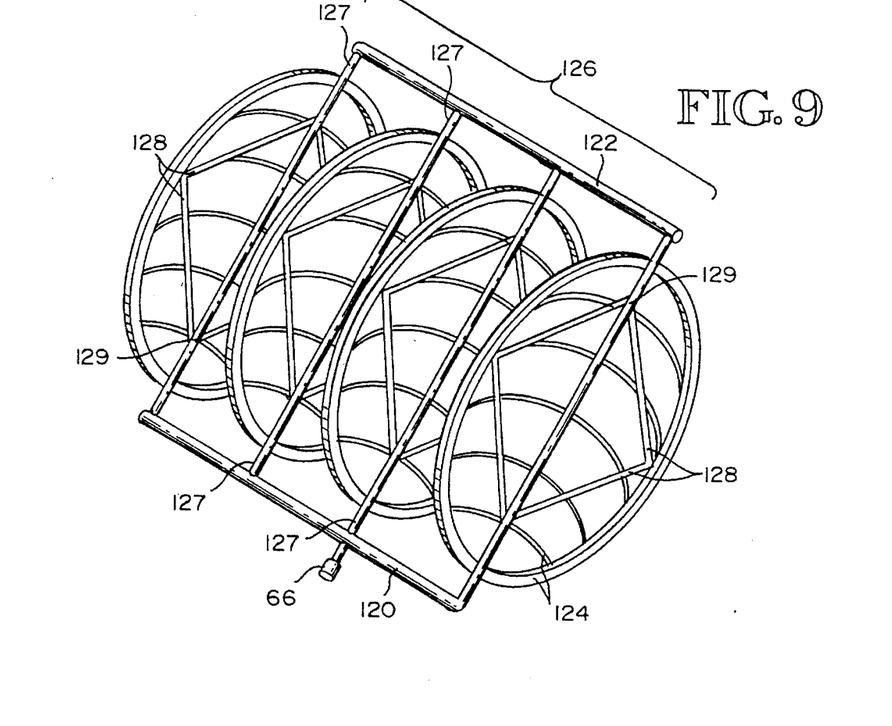
FIG. 9 Three dimensional isometric view of the second food support array group.

As with the heating plates, the food support screens for all groups are virtually identical (see FIGS. 8 and 9). They consist of outer frames and screens 100 and 124 respectively. Each food support screen is provided with additional support by means of frameworks 108 and 128, which are attached to crossmembers 104 and 127. The curvature of the screen wires is similar to the path followed by a food basket as it is raised and lowered. This configuration prevents the food support screens from snagging the cross wires of the food baskets as they are moved. The lateral motion of the movable groups of these arrayed groups is shown in the schematic diagrams of FIGS. 3 and 4.

Figure 15:
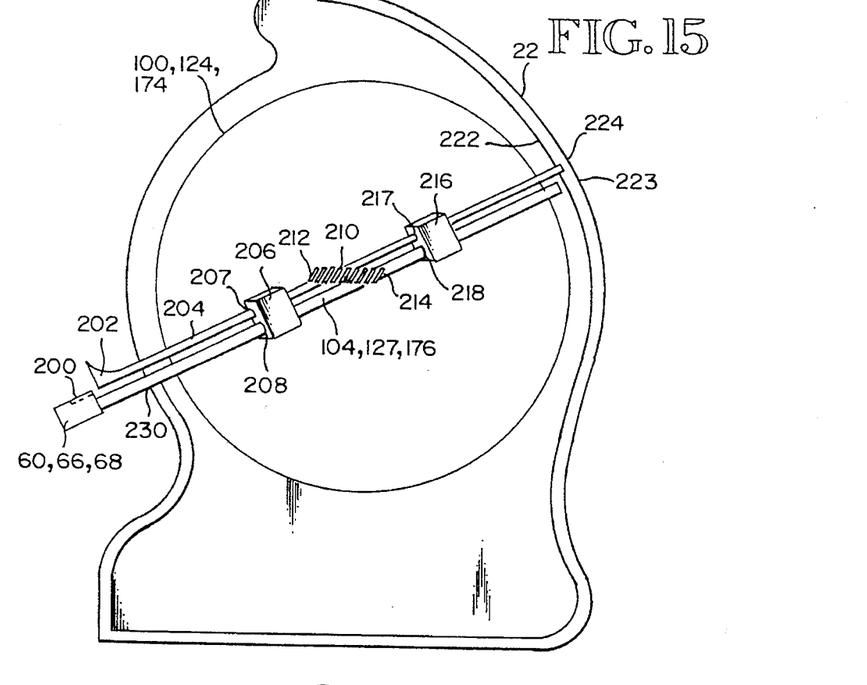
FIG. 15 A two dimensional cross section view of a representative positioning rail and control rod handle, showing the spring activated mechanism for adjusting each movable array and for holding the adjusted array in position.

The first and second food support screens and the adjustable heating element arrays are fixed in their adjusted positions by means of the device shown in FIG. 15. This mechanism., or one similar to it, is attached to each crossmember 104, 127, and 176 ending with a control rod 60, 66, and 68. As the operator grasps the control rod handle 60, 66, and 68, the operator's thumb draws back handle 202 into slot 200 cut into each control rod handle. Spring 210 is fixedly attached to both crossmember 104, 127, and 176, and to each spring activated positioning rod 204. Spring activated positioning rod 204 is slidably attached to guides 206 and 216 at junctures 207 and 217. Guides 206 and 216 are each fixedly attached to crossmembers 104, 127, and 176. When the operator retracts spring activated positioning rod 204, rod 204's second end 224 is drawn out of either a longitudinal slot or a hole cut into the inside layer 222 of the food heater's rear wall 22. Inside layer 222 can be formed either by use of an additional piece of sheet metal separate from rear wall 22, or rear wall 22 can be formed with enough thickness to accommodate the slots or holes necessary for successful operation of spring activated positioning rod 204.

An alternative preferred embodiment is partially shown in FIG. 15. In this embodiment, there is no back carrier rail. Instead, a longitudinal slot 223 is formed in the back 222 of the body 22. Also, there is no front carrier rail. The configurations of the various adjustable array groups and their orientation with respect to each other is identical to that discussed above with one exception. That exception is that the positioning rails rest on the lower edge 230 of the open area 80. The crossmembers at the back of the body fit slidably within slot 223. In this embodiment, the spring activated positioning rods 204 would have their ends 224 placed into small holes cut into the rear of slot 223. The diameter of the spring activated positioning rods 204 would be much smaller than the diameter of the crossmembers in this embodiment, so that the crossmembers could slidably move in slot 223 without obstruction.

The adjustable food basket arrays are locked into horizontal position by means of notches 305 cut into front edge 230 of the food heater as shown in FIG. 16. The food basket front positioning rail 140 with handle 62 is adjusted so that the crossmember 152 ending in control handle 62 (see FIG. 10A) falls into one of the notches 305. Each notch 305 is set at a predetermined position to accommodate either a tortilla, conventional toast, or a larger size food item. Alternative embodiments include less than three notches or more than three notches depending upon the specific intended use of the food heater. None of these alternative embodiments are shown in the illustrations.

In another preferred embodiment, the body 12 is placed on its first end 24, which puts the entire food heater 10 in a vertical orientation, as shown in FIG. 2. In this embodiment, the first group food support screens 100 are made sturdier to resist the added weight. Also, in this embodiment, the additional structural support members 128 (FIG. 9) may be omitted as unnecessary.

While this invention is susceptible to embodiment in different forms, the drawings and the specification illustrate the preferred embodiment and a second embodiment of the invention, with the understanding that the present disclosure is to be considered an exemplification of the principles of the invention, and the disclosure is not intended to limit the invention to the particular embodiments described.

I claim:

1. A food heater comprising:

a. a body having a front, a back, a first end, a second end, a longitudinal axis and an internal cavity, said body forming a protective cabinet;

b. a front carrier rail and a back carrier rail, which extend the length of the body and are substantially parallel to one another and to the longitudinal axis of the body;

c. a first food support screen having a lower edge, said first support screen perpendicular to a crossmember, said crossmember being supported by and parallel to said back carrier rail, said first food support screen being attached at its lower edge to said crossmember in such a way as to allow lateral movement along said crossmember;

d. a second food support screen having a lower edge, said second food support screen mounted perpendicular to a crossmember, said crossmember being supported by and parallel to said back carrier rail, said second food support screen being attached at its lower edge to said crossmember in such a way as to allow lateral movement along said crossmember;

e. said first food support screen and second food support screen being located adjacent to one another, with a variable gap in between to receive a food item to be heated;

f. a food basket support pivotally attached to a crossmember, said crossmember being supported by and parallel to said back carrier rail, for supporting the lower edge of the food between the first and second food support screens, said food basket support attached to said crossmember in such a way as to allow lateral movement along said crossmember;

g. a first heating element pivotally attached to a crossmember, said crossmember being supported by and parallel to said back carrier rail, said first heating element being attached at its terminal edge to said crossmember in such a way as to allow lateral movement along said crossmember;

h. a second heating element pivotally attached to a crossmember, said crossmember being supported by and parallel to said back carrier rail, said second heating element being attached at its terminal edge to said crossmember in such a way as to allow lateral movement along said crossmember;

i. said first heating element being located adjacent to said first food support screen, and said second heating element being located adjacent to said second food support screen; and j. said first and second food support screens, and said first and second heating elements being substantially parallel to one another, forming a food heating enclosure which may be opened to receive a food item, and closed to an adjustable width to accommodate food items of various thicknesses for heating, or toasting.

2. The food heater of claim 1, said food heater comprising a plurality of said food heating enclosures.

3. The food heater of claim 2, wherein said plurality of food heating enclosures are spaced apart from one another in a vertical orientation, forming a horizontal array of vertically oriented food heating enclosures, said array being partially enclosed within a protective cabinet.

4. The food heater of claim 1, said protective cabinet having a tray removably inserted beneath the food enclosures, said tray receiving crumbs falling from the food enclosures.

5. The food heater of claim 2, in which said plurality of food heating enclosures are spaced apart from one another in a horizontal orientation, forming a vertical array of horizontally oriented food heating enclosures, said array being partially enclosed within a protective cabinet.

6. The food heater of claim 1, said food heater being activated and deactivated with a timed switch.

7. The food heater of claim 1, said first heating element and said second heating element each consisting of a large element and a small element, wherein the large heating element and the small heating element are selectively activated independent of one another.

8. The food heater of claim 1, wherein said first and second heating elements are removably attached to said carrier rail.

9. The food heater of claim 1, wherein a lever is perpendicularly attached to the carrier rail of the food support basket, which the lever, when pushed at a downward angle, will cause said food support basket to raise and partially eject the food item supported by the food support basket, thereby allowing the food item to be removed without touching the heating elements.

10. The food heater of claim 1, in which the food item being heated includes tortillas, bread, pizzas, sandwiches and pastries.

11. A food heater comprising a plurality of food heating enclosures, said enclosures comprising:

a. a first and second adjustable food support each having an outer edge, said first and second adjustable food supports perpendicular to, and slidably attached at their outer edges to a carrier rail;

b. an adjustable food basket support pivotally and slidably attached to a carrier rail for supporting food in place between the first and second food supports;

c. a first heating element having a terminal edge, said first heating element perpendicular to, and slidably attached at its terminal edge to, a carrier rail with said first food heating element being adjustable in position, and a second heating element having a terminal edge, said second heating element perpendicular to, and fixedly attached at its terminal edge to a carrier rail with said second heating element being fixed in position, said first and second heating elements being positioned on either side of said first and second adjustable food supports;

d. an enclosure formed by the first and second adjustable food supports, said food basket support, said first and second heating elements, said enclosure being adjustable to accommodate a food item of various sizes for heating or toasting;

said first adjustable food support being joined to a common carrier rail, allowing for simultaneous adjustment of each of the first adjustable food supports;

said second adjustable food supports being joined to a common carrier rail, allowing for simultaneous adjustment of each of the second adjustable food supports;

said food basket supports being joined to a common carrier rail, allowing for simultaneous adjustment of each of the first adjustable food supports; and said first food heating elements being joined to a common carrier rail, allowing for simultaneous adjustment of each of the first adjustable heating elements.

12. The food heater of claim 11, having a means for simultaneously adjusting the food enclosures to a plurality of predetermined sizes to accommodate food items of varying sizes.

13. The food heater of claim 11, said protective cabinet having an opening in its base which will receive crumbs falling from the food enclosures.

14. The food heater of claim 11, wherein said plurality of food heating enclosures are spaced apart from one another in a vertical orientation, forming a horizontal array of vertically oriented food heating enclosures, said array being partially enclosed in a within a protective cabinet.

15. The food heater of claim 11, in which said plurality of food heating enclosures are spaced apart from one another in a horizontal orientation, forming vertical array of horizontally oriented food heating enclosures, said array being partially enclosed within a protective cabinet.

16. The food heater of claim 11, said food heater being activated and deactivated with a timed switch.

17. The food beater of claim 11, said first heating element and said second heating element each consisting of a large element and a small element, wherein the large heating element and the small heating element may be selectively activated independent of one another.

18. The food beater of claim 11, wherein said first and second heating elements are removably attached to said carrier rail.

19. The food heater of claim 11, wherein a lever is perpendicularly attached to the carrier rail of the food support basket, which the lever, when pushed at a downward angle, will cause said food support basket to raise and partially eject the food item supported by the food support basket, thereby allowing the food item to be removed without touching the heating elements.

20. The food heater of claim 11, in which the food item being heated includes tortillas, bread, pizzas, sandwiches and pastries.

* * * * *